United States Patent [19]

Holmes

[11] 4,373,906
[45] Feb. 15, 1983

[54] MULTI-LAMP PHOTOFLASH UNIT AND FABRICATING PROCESS

[75] Inventor: James L. Holmes, Montoursville, Pa.

[73] Assignee: GTE Products Corporation, Stamford, Conn.

[21] Appl. No.: 221,074

[22] Filed: Dec. 29, 1980

[51] Int. Cl.³ .............................................. F21K 5/02
[52] U.S. Cl. ...................................... 431/359; 362/11
[58] Field of Search ................ 431/359, 357; 362/11, 362/13, 15

[56] References Cited

U.S. PATENT DOCUMENTS

| | | | |
|---|---|---|---|
| 3,857,667 | 12/1974 | Vetere | 431/359 |
| 3,956,625 | 5/1976 | Anderson | 431/359 X |
| 4,306,855 | 12/1981 | Brower et al. | 431/359 |
| 4,326,242 | 4/1982 | Broadt et al. | 362/11 |

Primary Examiner—Edward G. Favors
Attorney, Agent, or Firm—Thomas H. Buffton

[57] ABSTRACT

A multi-lamp photoflash unit includes a housing member having a plurality of spaced cavities in a back portion and a light transmittable front portion formable to enclose the cavities, a reflector unit having a multiplicity of spaced cavities formed to nest in the cavities of the housing member, and an aperture extending through the reflector unit and housing member to provide venting from the cavities to the exterior of the housing member.

Also, the multi-lamp photoflash unit is fabricated by a process which includes the forming of a housing member having a back portion with a plurality of spaced cavities and a foldable light transmitting front portion, a reflector unit having a multiplicity of spaced cavities formed to nest in the cavities of the housing member and an aperture for venting the reflector unit cavities to the exterior of the housing member.

21 Claims, 4 Drawing Figures

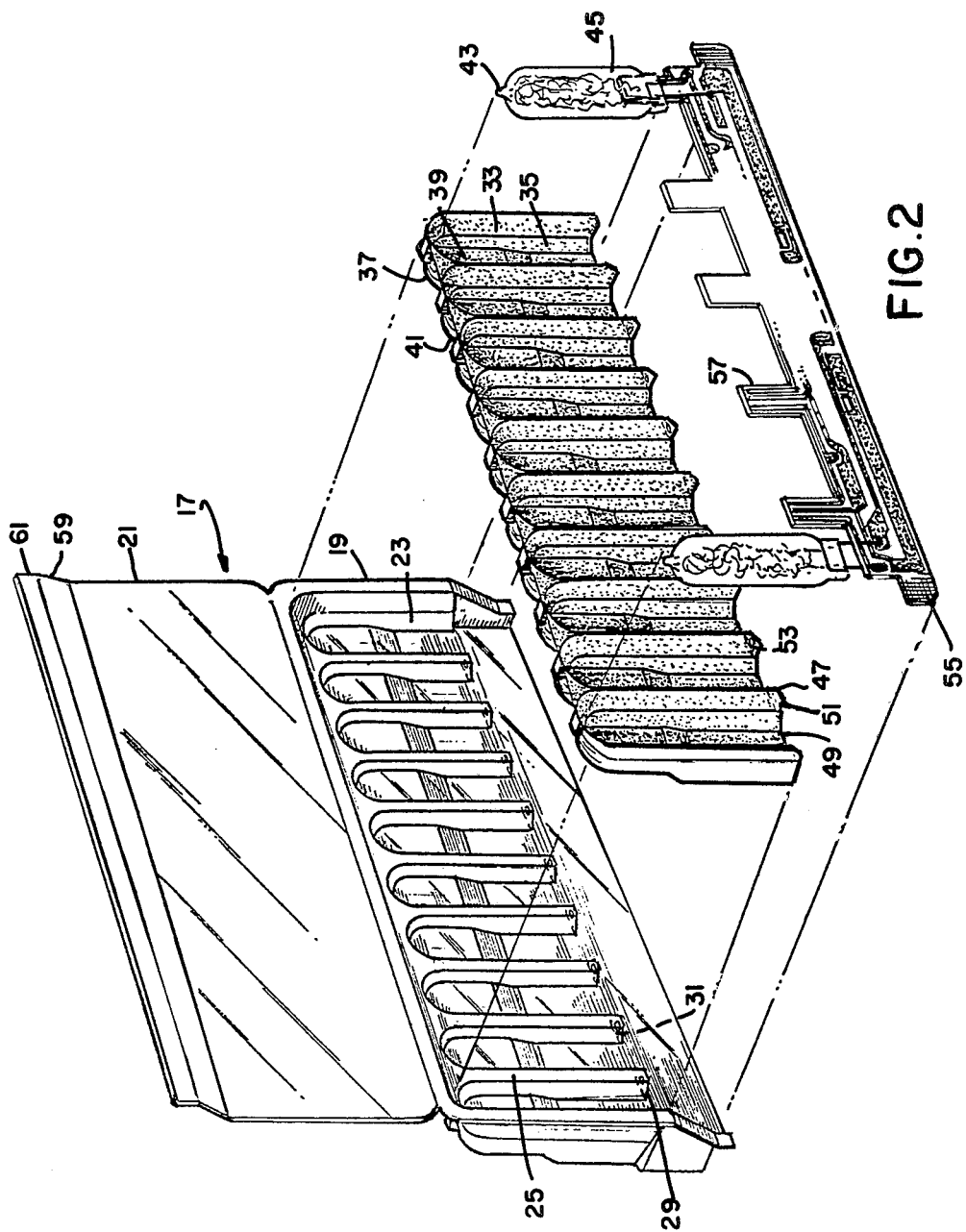

MULTI-LAMP PHOTOFLASH UNIT AND FABRICATING PROCESS

CROSS REFERENCE TO RELATED APPLICATION

A concurrently filed application bearing U.S. Ser. No. 221,073 has been filed in the name of David R. Broadt and is entitled "Reflector Insert For Multi-flash Unit". Also, a concurrently filed application bearing U.S. Ser. No. 221,132 has been filed in the names of David R. Broadt and John W. Shaffer and is entitled "Vented Multi-lamp Photoflash Unit".

TECHNICAL FIELD

This invention relates to multi-lamp photoflash units and a process for fabricating such units and more particularly to a photoflash unit having a reflector unit with cavities nesting in the cavities of a housing member and a venting aperture extending through the reflector unit and housing member. The photoflash unit is fabricated by forming a housing member and a reflector unit, nesting the reflector unit in the housing member, and providing a venting aperture in the housing member and reflector unit separate from the spaced cavities.

BACKGROUND ART

Multi-lamp photoflash units are usually of either a cube configuration or a linear configuration. The cube configuration is illustrated by the flashcube of U.S. Pat. No. 3,327,105 or the magicube of U.S. Pat. No. 3,730,669. The linear configuration is set forth as either the flash bar of U.S. Pat. No. 3,857,667 or the flip flash of U.S. Pat. No. 4,017,728.

The above-mentioned cube configuration normally is in the form of a cube-shaped housing member wherein a folded reflector is contained. The folded reflector is in the form of a plurality of cavities which are each at an angle of 90° to the adjacent cavities. The linear-type configuration is often in the form of a plurality of cavities folded in a back-to-back arrangement to provide a pair of rows of cavities directed in opposite directions. These oppositely directed rows of cavities are contained within a substantially planar and rigid housing member. Alternatively, all of the cavities may be aligned in a single direction and confined by a relatively rigid housing member.

Additionally, it is a common practice to provide an aperture for venting the cavities to the exterior of the housing member. In the known art, these venting apertures have been undesirably located within the confines of the cavities. Unfortunately, an aperture located within a cavity which also contains a flashlamp provides a direct path for flashlamp particles from the cavity to the exterior of the housing member. Obviously, a direct path for glass particles or fragments is highly undesirable since such particles or fragments may be missle-like in nature with an impact energy of considerably destructive effect.

SUMMARY OF THE INVENTION

An object of the invention is to provide an enhanced multi-lamp photoflash unit. Another object of the invention is to provide an improved process for fabricating an enhanced multi-lamp photoflash unit. Still another object of the invention is to provide a multi-lamp photoflash unit having an improved reflector attachment and venting capability. A further object of the invention is to provide an improved process for economically fabricating an enhanced multi-lamp photoflash unit having a vented housing member and a vented and attached reflector disposed therein.

These and other objects, advantages and capabilities are achieved in one aspect of the invention by a multi-lamp photoflash unit having a housing member with a back portion wherein is provided a plurality of cavities and a light transmitting front portion formed to fold over and enclose the cavities, a reflector unit having a plurality of cavities formed to nest in the cavities of the housing member and a venting aperture extending through the reflector unit and housing member to provide venting of the cavities and attachment of the reflector unit to the housing member.

In another aspect of the invention, a multi-lamp photoflash unit is fabricated by a process wherein a housing member having a back portion with a plurality of cavities and a light transmitting front portion is formed, a reflector unit with cavities configured to nest in the cavities of the housing member is formed, the reflector unit is positioned within the housing member, and an aperture is provided in the reflector unit and housing member to facilitate venting of the cavities.

BRIEF DESCRIPTION OF THE DRAWINGS

FIG. 2 is an exploded view of a preferred embodiment of a multi-lamp photoflash unit;

BEST MODE FOR CARRYING OUT THE INVENTION

For a better understanding of the present invention, together with other and further objects, advantages and capabilities thereof, reference is made to the following disclosure and appended claims in conjunction with the accompanying drawings.

Figure 1:
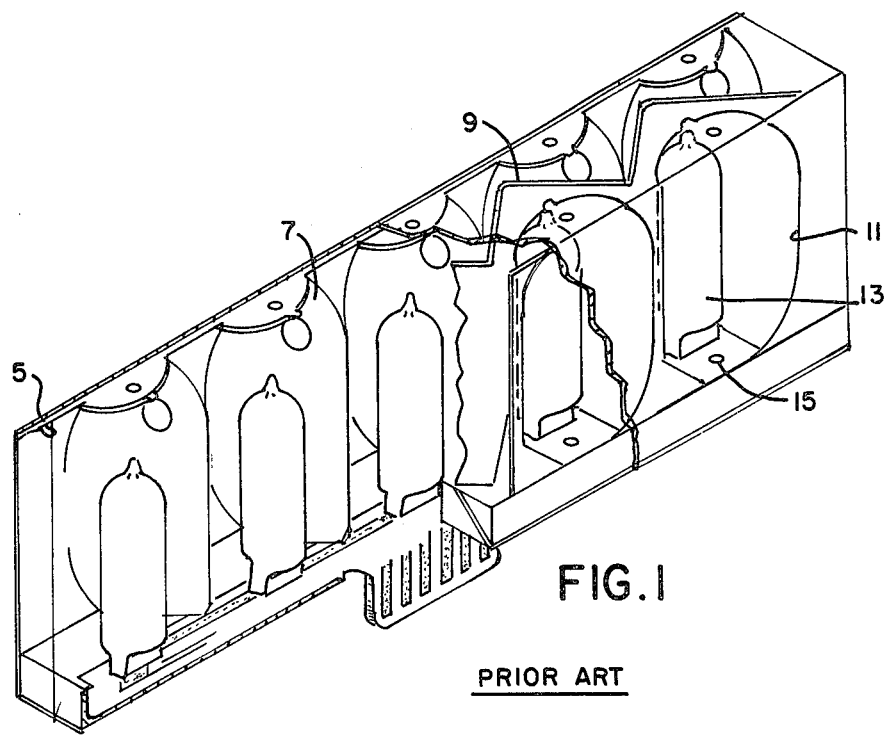
FIG. 1 illustrates a prior art form of vented multi-lamp photoflash unit.

Referring to the drawings, FIG. 1 illustrates a prior art form of multi-lamp photoflash unit. Therein, a relatively rigid housing member 5 encloses a plurality of spaced cavities 7 which are arranged in rows and in a back-to-back relationship. The rows are separated by a folded divider 9 and each of the cavities 7 has a reflective surface 11 and is formed to receive a flashlamp 13. Also, each of the cavities 7 containing a flashlamp 13 also has positioned therein a venting aperture 15. Thus, the venting aperture 15 undesirably provides a direct passageway from the interior of the cavities 7 to the exterior of the housing member 5. Obviously, a direct path for fragments or particles from the interior of the cavities 7 to the exterior of the housing member 5 leaves something to be desired.

Figure 3:
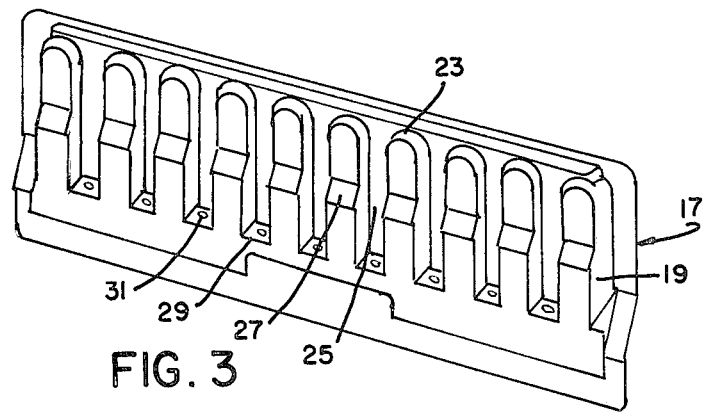
FIG. 3 is a rear elevational view of a multi-lamp photoflash unit of the invention.

As to a preferred form of multi-lamp photoflash unit, reference is made to FIG. 2 and 3. Therein, a housing member 17, such as a 0.015 inch sheet of polycarbonate for example, has a back portion 19 and a front portion 21. The back portion 19 includes a plurality of spaced cavities 23 aligned in a single plane and direction. Each of the cavities 23 has a longitudinal axis and the axes of all of the cavities 23 are parallel to one another.

Also, the sides of each pair of the cavities 23 diverge from a junction 25 whereat they are joined to a spaced apart location 27. A planar surface 29 extends from the junction 25 of the joined cavities 23 to the spaced apart location 27 in a plane substantially normal to the longitudinal axis of each of the cavities 23. Importantly, an aperture 31 is located in at least one of the planar surfaces 29 intermediate a pair of cavities 23. Moreover, an aperture 31 for venting the cavities 23 is preferably provided in the planar surface 29 intermediate each pair of the plurality of spaced cavities 23.

A reflector unit 33 is formed to provide a plurality of spaced cavities 35 each having a back surface 37 configured to nest within the cavities 23 of the housing member 17. The spaced cavities 35 also include a front surface 39 having a reflective coating thereon and including a notch 41 therein for receiving the tip portion 43 of a flashlamp 45.

Each pair of the spaced cavities 35 of the reflector unit 33 has a junction 47 at the front surface 39 which tapers to a spaced portion 49 at the back surface 37. A planar surface 51 in a plane substantially normal to the longitudinal axis of the spaced cavities 35 extends from the junction 37 to the spaced portion 49 of each pair of the cavities 35. Also, a venting aperture 53 is located in at least one, and preferably each one, of the planar surface 51.

Further, the planar surfaces 51 of the reflector unit 33 are coincident and in contact with the planar surfaces 29 of the housing member 17 when the cavities 35 of the reflector unit 33 are nested in the cavities 23 of the housing member 17. Also, the venting aperture 53 of the reflector unit 33 are aligned with the apertures 31 of the housing member 17 under the above-mentioned nesting conditions.

Additionally, the flashlamps 45 are affixed to a printed circuit board 55 which includes a plurality of finger-like extensions 57 formed for positioned location within the cavities 35 of the reflector unit 33. Moreover, the front portion 21 of the housing member 17 is of a light transmitting material and includes a tapered portion 59 and a flattened portion 61. This front portion 21 of the housing member 17 folds over and forms a sealed structure wherein a portion of the printed circuit board 55 is sandwiched between the flattened portion 61 of the front portion 21 and the back portion 19 of the housing member 17. Moreover, the reflector unit 33 as well as the planar surface 51 thereof wherein is disposed the venting aperture 53 are enclosed within the housing member 17.

As to the fabrication of the above-described multi-lamp photoflash unit, a light-transmitting material, such as 0.015 inch polycarbonate material for example, is cut and preferably vacuum formed to provide a housing member 17. As previously mentioned, this vacuum formed housing member 17 includes a back portion 19 with a plurality of spaced cavities 23. Each pair of the cavities 23 has a junction 25 which tapers to a spaced apart location 27 with a planar surface 29 extending intermediate the junction 25 and the spaced apart location 27. The housing member 17 also includes a light-transmitting front portion 21 which is formed to fold over and enclose the spaced cavities 23.

Another piece of material, such as a 0.010 inch piece of polycarbonate, is vacuum-formed to provide the reflector unit 33. This reflector unit 33 also includes the spaced cavities 35 formed to nest in the cavities 23 of the housing member 17. The front surface 39 of the reflector unit 33 is formed to include a notch 41 for receiving the tip portion 43 of a flashlamp 45 and is coated with a material such as aluminum to provide a reflective surface.

This reflector unit 33 is positioned within the housing member 17 with the cavities 35 thereof nested within the cavities 23 of the housing member 17. Also, the planar surface 51 of the reflector unit 33 is aligned and in contact with the planar surface 29 of the housing member 17.

Thereupon, apertures 53 and 31 are provided in the planar surfaces 51 and 29 of the reflector unit 33 and housing member 17 respectively. Preferably, a heated pin (not shown) is passed through the planar surfaces 51 and 29 intermediate at least one pair of cavities of the reflector unit 33 and housing member 17. In this manner, there is provided a venting aperture 31 and 53 or a passageway from the interior of the reflector unit 33 to the exterior of the housing member 17. Obviously, the utilization of multiple heated pins to provide apertures 31 and 53 intermediate each pair of cavities 35 and 23 is preferred.

Further, utilizing the above-mentioned hot pin technique to provide the desired venting apertures 31 and 53 is accompanied by the added capability of attaching the reflector unit 33 to the housing member 17. The combination of the hot pin technique and the polycarbonate material causes the development of the desired apertures 31 and 53 and also provides a sealed engagement surrounding the apertures 31 and 53 of the contacting planar surface 51 of the reflector unit 33 and the planar surface 29 of the housing member.

Thereafter, printed circuit board 55 with the affixed flashlamps 45 is positioned such that the flashlamps 45 are within the cavities 35 of the reflector unit. Then, the front portion 21 of the housing member 17 is folded over to enclose the flashlamps 45 and cavities 35 as well as one side of the planar surface 51. Thereupon, the printed circuit board 55 is sandwiched and sealed intermediate the back portion 19 and the flattened portion 61 of the housing member 17.

Figure 4:
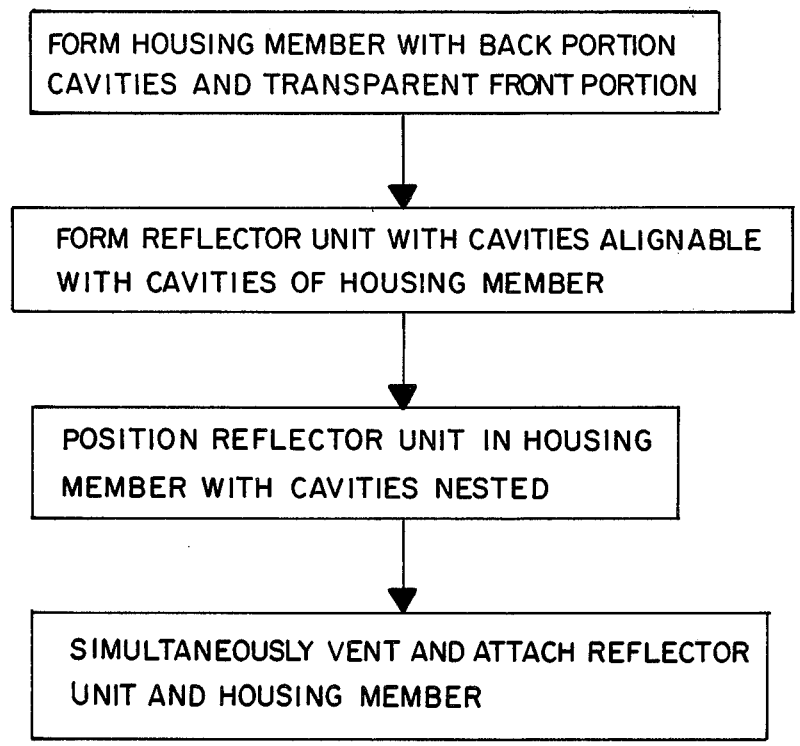
FIG. 4 is a chart illustrating a preferred process for fabricating a multi-lamp photoflash unit.

Referring to FIG. 4, the multi-lamp photoflash unit is provided by a process which includes forming a housing member having a back portion with a plurality of cavities and a transparent front portion which transmits light and is foldable. Then a reflector unit with cavities alignable with the cavities of the housing member is formed and positioned within the housing member. Thereafter, the reflector unit and housing member are simultaneously vented and attached to one another whereby the reflector unit is positionally held within the housing member and both are vented. Thus, the structure is completed and suitable for utilization.

While there has been shown and described what is at present considered the preferred embodiments of the invention, it will be obvious to those skilled in the art that various changes and modifications may be made therein without departing from the scope of the invention as defined by the appended claims.

INDUSTRIAL APPLICABILITY

A multi-lamp photoflash unit has been provided wherein a reflector unit having multiple spaced cavities is disposed within a housing member with the cavities of the reflector unit nested within the cavities of the housing member. The housing member and reflector unit both include planar surfaces intermediate each pair of cavities and a venting aperture is located in each of the planar surfaces. This venting aperture is of a nature such that the reflector unit is affixed to the housing member and an aperture or passageway is provided between the planar surface adjacent the cavities of the reflector unit and the exterior of the housing member. This, an indirect, rather than direct, path for venting the cavities is achieved and there is no direct passageway for the exit of glass fragments or particles.

Also, the multi-lamp photoflash unit is fabricated by a process which is economical of materials and provides a structure which is economical of space. Also, the reflector unit and housing member are vented, attached and sealed with minimal operations and apparatus. Moreover, assembly of the apparatus is economically enhanced by the unique process set forth.

What is claimed is:

1. A multi-lamp photoflash unit comprising:
   a housing member having back and front portions with said back portion having a plurality of spaced cavities each having a longitudinal axis and a planar surface intermediate each pair of said spaced cavities normal to said longitudinal axis, said front portion transmitting light and formed to enclose said cavities and one side of said planar surface;
   a reflector unit having a plurality of spaced cavities with a back surface thereof nesting within said cavities of said housing member and a front surface having a light reflective surface and formed to receive a flashlamp, said reflector unit having a planar surface intermediate each pair of said cavities and aligned with a planar surface of said housing member; and
   a venting aperture extending through at least one aligned planar surface of said reflector unit and housing member.

2. The multi-lamp photoflash unit of claim 1 wherein said venting aperture extending through at least one planar surface of said reflector unit and housing member is of a form to provide attachment therebetween whereby said reflector unit is retained within said housing member.

3. The multi-lamp photoflash unit of claim 1 wherein said venting aperture is of a form to provide venting of cavities through said reflector unit and housing member.

4. The multi-lamp photoflash unit of claim 1 wherein each of said planar surfaces of said housing member and reflector unit includes a venting aperture therethrough.

5. The multi-lamp photoflash unit of claim 1, wherein said housing member and reflector unit are of a material to provide attachment therebetween upon application of heat thereto.

6. The multi-lamp photoflash unit of claim 1, wherein said housing member and reflector unit are formed from polycarbonate material whereby heating provides attachment therebetween.

7. The multi-lamp photoflash unit of claim 1 wherein each pair of cavities of said housing member and reflector unit includes a jointure portion and a spaced-apart portion therebetween with a planar surface extending intermediate said jointure and spaced-apart portions.

8. The multi-lamp photoflash unit of claim 1 wherein a venting aperture extends through each of the aligned planar surfaces of said reflector unit and housing member.

9. The multi-lamp photoflash unit of claim 1 wherein said reflective unit spaced cavities each have a front surface for receiving a flashlamp which includes a notch formed to accommodate the tip of a flashlamp.

10. A multi-lamp photoflash unit comprising:
    a housing member having a back portion with a plurality of spaced cavities each having a longitudinal axis and a planar surface normal to said longitudinal axes intermediate each pair of said plurality of cavities and a front portion of light transmitting material and formed to enclose said cavities and planar surface;
    a reflector unit having a plurality of spaced cavities with a back surface formed to nest in said plurality of cavities of said housing member, a front surface of reflective material and formed to receive a flashlamp, and planar surface intermediate and normal to each pair of cavities and aligned with said planar surfaces of said housing member; and
    an aperture for venting said cavities extending through said aligned planar surfaces of said reflector unit and housing member whereby an indirect passage is provided between said cavities and the exterior of said housing member.

11. The multi-lamp photoflash unit of claim 10 wherein each pair of said plurality of spaced cavities of said housing member have a jointure portion and a spaced portion therebetween and said planar surface extends intermediate and normal to said jointure and spaced portions.

12. The multi-lamp photoflash unit of claim 10 wherein said reflector unit includes a plurality of spaced cavities with each of said cavities formed to nest within a cavity of said housing member and including a notch formed to accommodate the tip of a photoflash lamp.

13. The multi-lamp photoflash unit of claim 10 wherein said front portion of said housing member is contoured to fold over and enclose said cavities of said housing member and reflector unit with said planar surface of said reflector unit having said aperture for venting extending therethrough.

14. The multi-lamp photoflash unit of claim 10 wherein said aperture for venting said cavities is formed in a manner to attach said reflector unit to said housing member.

15. The multi-lamp photoflash unit of claim 10 wherein said aperture for venting said cavities includes a perimeter affixing said reflector unit to said housing member.

16. A multi-lamp photoflash unit fabrication process comprising the steps of:
    forming a housing member having a back portion with a plurality of spaced cavities and a light transmittable front portion formed to enclose said cavities;
    forming a reflector unit having a plurality of spaced cavities with a back portion formed to nest in said cavities off said housing member and a front portion having a reflective surface with a notch formed to receive the tip of a flashlamp positioned within said cavities;
    positioning said reflector unit within said housing member to cause the nesting of said cavities of said reflector unit within said cavities of said housing member; and
    providing an aperture in said reflector unit and housing member to effect venting of said cavities.

17. The process of claim 16 including the step of attaching said reflector unit to said housing member.

18. The process of claim 16 wherein said housing member and said reflector unit each include at least one planar surface aligned and normal to the longitudinal axis of said cavities and said aperture for venting passes through said planar surfaces.

19. The process of claim 16 wherein each pair of said plurality of cavities of said housing member and said reflector unit includes a jointure portion and a spaced portion with a planar surface extending therebetween and a venting aperture located in each of said planar surfaces.

20. The process of claim 16 including the step of simultaneously venting and attaching said reflector unit to said housing member.

21. The process of claim 16 wherein said reflector unit and housing member each include a planar surface aligned intermediate each pair of cavities and an aperture passes through said aligned planar surfaces to effect simultaneous venting and attachment of said reflector unit and housing member.

* * * * *